T. G. MOUAT.
PRESSURE REGULATING APPARATUS.
APPLICATION FILED DEC. 8, 1915.

1,284,748.

Patented Nov. 12, 1918.
2 SHEETS—SHEET 1.

INVENTOR
Thomas G. Mouat
By Hall, Smith, Brock, & West
Att'ys

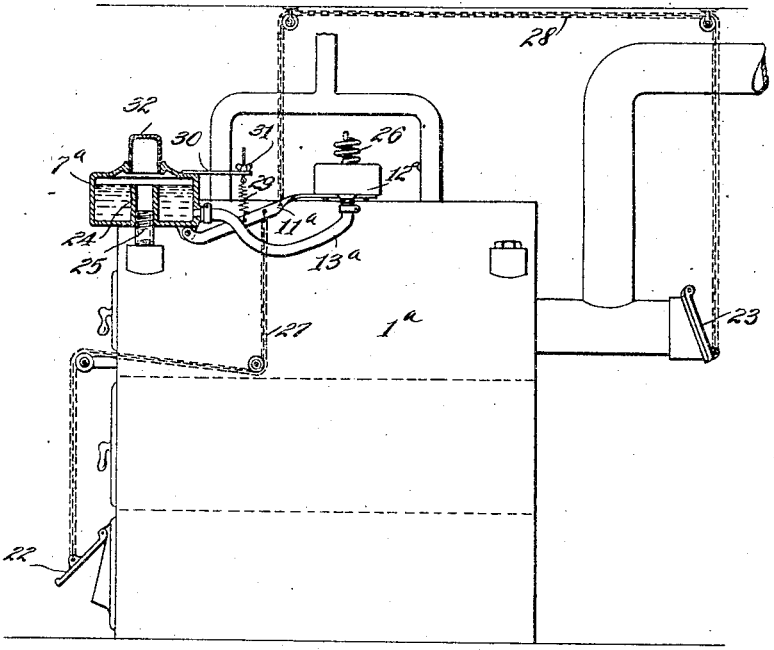

UNITED STATES PATENT OFFICE.

THOMAS G. MOUAT, OF BRATENAHL, OHIO.

PRESSURE-REGULATING APPARATUS.

1,284,748.  Specification of Letters Patent.  Patented Nov. 12, 1918.

Application filed December 8, 1915. Serial No. 65,659.

*To all whom it may concern:*

Be it known that I, THOMAS G. MOUAT, a citizen of the United States, residing at Bratenahl, in the county of Cuyahoga and State of Ohio, have invented a certain new and useful Improvement in Pressure-Regulating Apparatus, of which the following is a full, clear, and exact description, reference being had to the accompanying drawings.

In steam heating apparatus it is known that if a sufficiently low pressure of steam be maintained its rate of flow can be controlled at the radiators by merely adjusting the amount of opening of the valves, with the result that adjacent radiators can be heated in different amounts; and that if this pressure be maintained sufficiently even the same heating rate will be maintained indefinitely. The steam pressure necessary to this mode of regulation must be extremely small, since otherwise the steam will rush in and fill the whole radiator no matter how small an amount of valve opening is permitted, and the difficulty of maintaining an even pressure is enhanced by the smallness of working pressure which prevents the employment of valves, diaphragms, pistons, or other mechanical parts to be operated by the pressure. In the most practical systems the pressure employed ranges from one ounce per square inch up to about three ounces per square inch with a permissible variation, not greater than one half an ounce per square inch above or below the desired pressure. When it is considered that a pressure of one half ounce per square inch corresponds approximately to that exerted by a column of water only one inch in height it will be seen that the regulating apparatus must be made extremely sensitive. In my patent issued October 19, 1909, No. 937,686, I disclosed and claimed a pressure regulating device for low pressure steam boilers wherein an increase in the steam pressure serves to eject a quantity of water from a fixed receptacle into a movable receptacle which is connected with the fire-controlling devices, a constant level of water in the fixed receptacle being maintained by draining into it the condensation of some part of the system. I have discovered that it is not necessary to employ any drainage whatever since the condensation of steam in the fixed receptacle alone will be sufficient to maintain the level required, particularly in case such condensation be augmented by increasing the size of the receptacle, or increasing its rate of cooling, or in case the loss of water be minimized by preventing slopping and hindering evaporation from the movable chamber.

Figure 1:
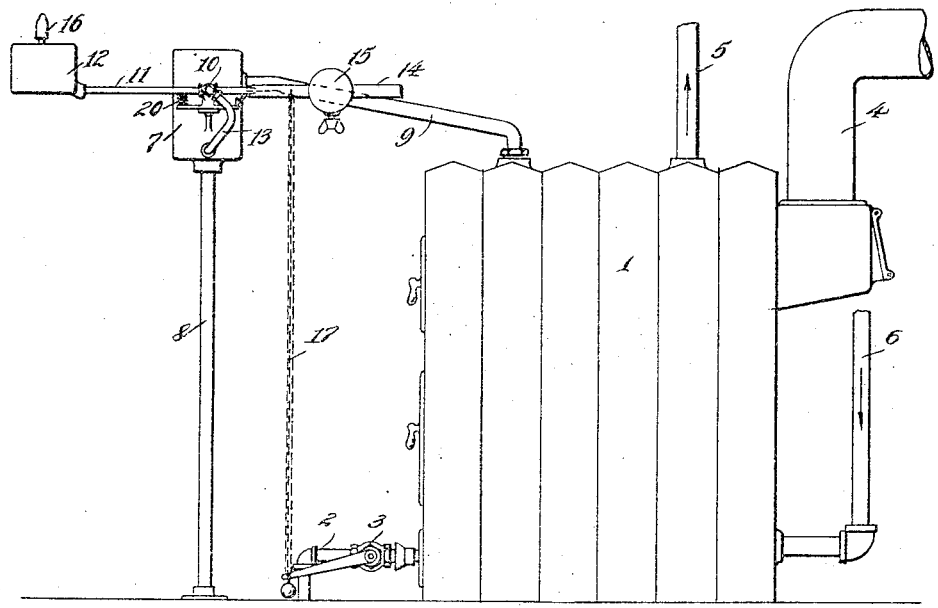
Figure 2:
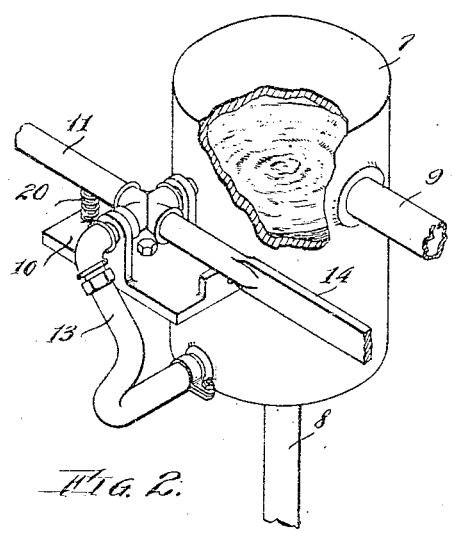
Figure 5:
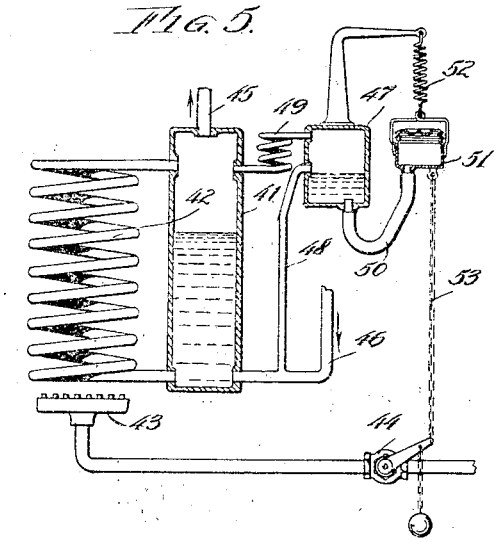

In the drawings accompanying and forming a part of this application I have shown certain constructions and arrangements in which my invention may be embodied although it will be understood that many other embodiments in addition to those herein specifically described are included in the scope of the claims hereto annexed. In these drawings Figure 1 represents a side elevation of a steam generator provided with one embodiment of my improved pressure regulator; Fig. 2 is a perspective view of the stationary receptacle, a portion of the side being broken away; Fig. 3 represents a side elevation of a generator having a different specific embodiment of my invention applied thereto, the fixed receptacle being shown in vertical section; Fig. 4 is a front elevation of another generator having a third form of my invention applied thereto, the movable receptacle being partly broken away; and Fig. 5 illustrates another type of steam generator having another type of my improved regulator attached thereto, the boiler and regulator being shown in cross section.

Describing by reference characters the parts shown in Fig. 1, 1 represents the steam generator which is indicated as gas fired, the gas supply pipe being shown at 2 and the gas control valve at 3, the products of combustion passing into the pipe 4. 5 represents the main steam pipe and 6 the return flow pipe between which any suitable radiating system (not shown) may be connected in any suitable or approved manner.

The pressure regulating apparatus here shown comprises a hollow metallic receptacle 7 supported in a stationary manner in any suitable way as by a standard 8 and having its upper portion communicating freely with the steam space of the generator by means of a suitable pipe 9, here shown as sloping toward the generator so that any condensation therein will be drained toward the generator and not toward the receptacle 7. Suitably pivoted in a bracket 10 supported adjacent the receptacle 7 is a hollow arm 11 to the end of which is fixed the movable receptacle 12, the interior of said receptacle being placed in communication with the interior of the receptacle 7 at a point below the end of the pipe 9 in any suitable manner as by means of the flexible tube 13. I have shown the arm 11 as extended in the opposite direction from the bracket 10 in the form of a bar 14 on which is adjustably mounted the counterweight 15 by which the weight of the receptacle 12 can be balanced, although this bar could extend at some other angle or the counterbalancing be effected entirely by means of springs as shown in other figures of this drawing. The upper part of the movable receptacle 12 is placed in constant communication with the atmosphere by means of a valve 16 which may be of the type shown in my prior art or any other suitable type arranged to permit the escape of air while impeding the evaporation or slopping of water. Also some part of the movable device such as the bar 14 is connected with the movable member of the valve 3 as by a chain 17.

With this arrangement I find that sufficient steam penetrates into the fixed receptacle 7 to condense there and maintain the same level of water to the height of the pipe 9 which in the present embodiment acts both as a pressure pipe and an overflow pipe, although a separate overflow may be employed as illustrated in other figures of this application. The adjustment of the parts is preferably such as to maintain the bottom of the receptacle 12 slightly above the level of the liquid in the fixed receptacle 7 while the parts are in normal position, but upon the elevation of pressure in the boiler some of the liquid in the receptacle 7 is forced into the receptacle 12 which thereby becomes overbalanced and sinks, raising the chain 17 and restraining the action of the heat generator. I have shown the receptacle 12 as having a flat bottom, since this affords the quickest increase of weight, and permits the transfer of an appreciable quantity of water from the receptacle 7 upon the slightest possible increase of boiler pressure. However the amount of water necessary to operate the device will depend upon the adjustment of the weight 15.

I have also illustrated a spring 20 operatively associated with the moving parts and adapted to restrain the sinking of the receptacle 12 with a force which varies directly with the amount of displacement. In the absence of such a spring, the slightest possible increase in weight of the receptacle 12 and its contents over that of the counterweight 15 will cause a slight movement of the moving parts, whereupon more liquid will automatically rush into the moving receptacle thus still further upsetting the balance, and so on until the moving parts reach the limit of their movement which arrives with a crash which frequently spills some of the liquid and always shuts off the fire far too much, as well as returning to elevated position rather slowly. By using some device which will oppose this movement increasingly as the movement progresses, it is found that the pressure in the steam generator will rise until there is exactly sufficient liquid in the receptacle 12 to balance this spring whereupon the adjustment will be maintained constant until a change in the weather occurs or until some radiator in the system is turned on or off.

In Fig. 3 I have shown a generator 1ª arranged to be heated by burning coal or other solid fuel and having a draft damper 22 and check 23. In this case I have illustrated a fixed receptacle 7ª formed with an upright internal boss 24 terminating at a point short of the top of the recepacle and having its lower end connected by means of a short nipple 25 with the top of the steam generator so that this nipple performs the function of the standard 8 and pipe 9 of the former embodiment. Pivoted to the receptacle 7ª is a movable arm 11ª carrying at its free end the vertically movable receptacle 12ª whose bottom is connected with the lower part of the receptacle 7ª by suitable flexible means such as the rubber tube 13ª. In this case the top of the receptacle 12 is provided with a small spiral coil 26 of narrow tubing, which minimizes slopping and vibration and tends to condense and return to the receptacle 12 any vapor that may rise therein.

The arm 11ª is connected to the dampers 22 and 23 by suitable chains or other tension devices 27, 28 respectively, and in this embodiment the arm is normally maintained in elevated position by means of a spiral spring 29 carried by a bracket 30 extending from the chamber 7ª, adjustment of the spring tension being permitted by the nut 31. Steam passing into the receptacle 7ª through the pipe 25 will be condensed to some extent on the walls of the receptacle, but in this embodiment I have illustrated a dome 32 of copper or the like conducting material arranged to augment such condensation. The spring 29 opposes the depression of the receptacle 12ª with a force dependent upon the displacement of the receptacle, thus permitting the apparatus to attain a constant stable position.

In Fig. 4 I have shown a steam generator 1ᵇ, smoke pipe 4, steam pipe 5, return pipe 6, draft damper 22, and check damper 23 as before. The fixed receptacle 7ᵇ is made of larger size than before so as to afford a greater condensing surface, and its cover is formed with internal ribs 35 for facilitating condensation and external ribs 36 to augment the radiation. A steam pipe 9 is employed as before but instead of permitting the overflow to return into the steam space of the boiler, a separate overflow pipe 37 is provided.

A pivoted arm 11<sup>b</sup> is employed having at one end a hollow receptacle 12<sup>b</sup>. In this view I have shown the motion communicated to the dampers by means of a suitable lever 38 thus avoiding the friction of pulleys and chains. Also connected to and movable with the lever 11<sup>b</sup> is a rigid rod 14<sup>b</sup> carrying an adjustable counterweight 15<sup>b</sup>, but in this case the rod 14<sup>b</sup> is shown as substantially vertical when the movable receptacle 12<sup>b</sup> is in elevated position, wherefore its effective lever arm will be increased as the receptacle is depressed and will oppose the displacement of the receptacle with a force varying directly as the amount of said displacement. It will be obvious to those skilled in the art that by changing the angle of the rod 14<sup>b</sup> and by making it suitably curved instead of straight, the proportion of increase of resistance to depression of the receptacle can be selected as desired.

Also in Fig. 4 I have shown the top of the receptacle 12<sup>b</sup> as connected, not directly with the open air, but with the return pipe 6 by means of a rigid pipe 39 and flexible tube 40. This permits the pressures inside the heating system to be maintained generally either above or below the atmospheric pressure while maintaining the predetermined pressure difference between the outflow and return sides of the system; this also renders the operation of the device practically independent of changes in barometric pressure.

In Fig. 5 I have illustrated a similar and more delicate system arranged particularly for employment with a water heater used as a steam generator. Certain types of so called instantaneous water heaters have been found to constitute particularly efficient generators for heating a few radiators or warming in mild weather. The amount of water used is comparatively small and special precautions must be taken against loss of this water and for accuracy of regulation in view of the great intensity of the flame. In this embodiment I have illustrated a steam and water chamber 41 connected with a heating coil 42 disclosed above a gas burner 43 controlled by a valve 44. The steam pipe is shown at 45 and the return pipe at 46. The fixed receptacle of my pressure regulator is shown at 47 and has an overflow pipe 48 communicating with the pipe 46 at a point below water level. The upper end of the receptacle 47 communicates with the steam space of the generator through a long narrow tube 49, whose length and narrowness is designed to introduce such friction into the steam passage as to overcome sudden fluctuations of pressure and to render the operation of the apparatus steady and uniform. Leading from the bottom of the receptacle 47 in a flexible pipe 50 connected with the bottom of the movable receptacle 51 which is normally supported slightly above the water level in the receptacle 47 by the spring 52. In order to prevent any possible loss of liquid by evaporation or slopping I have shown the top of the receptacle 51 as made of thin corrugated metal or the like flexible material. The gas supply is controlled by a suitable chain 53 as before. With this arrangement there is some compression of the air in the receptacle 51 as liquid is forced therein, which compression tends to return that liquid to the fixed receptacle thus increasing the speed of restoring the flame, while the flexibility of the walls of the receptacle prevent the occurrence of such a high pressure as to decrease unduly the sensitiveness of the apparatus.

While I have described my invention in detail and pointed out at length certain embodiments of the same it will be understood that these are only a small part of the embodiments which could be employed and that these details may be varied widely without departing from the scope of my invention as recited in the claims hereto annexed.

Having thus described my invention, what I claim is:—

1. The combination with a steam generating device and means for heating the same, of means for maintaining substantially constant the pressure of steam generated thereby, said means comprising a receptacle, said receptacle having an overflow, an open connection between said receptacle and the steam space of said generating device and arranged to drain away from said receptacle, a vertically movable receptacle having its lower part flexibly connected with the former receptacle at a point below said overflow and having its upper part opening freely into a region of lower pressure than exists inside said generator, means yieldingly opposing the depression of said movable receptacle, and operative connections between said movable receptacle and said heating means, said first receptacle being of a size, material, and character of surface to cause it to act as a condenser whereby it is maintained full of water.

2. The combination with a steam generating device and means for heating the same, of means for maintaining substantially constant the pressure of steam generated thereby, said means comprising a receptacle located with its top at least higher than the water in said generating device, an open passageway leading upwardly from the steam space of said generating device to the upper part of said receptacle, a second receptacle having its lower part communicating freely with a part of said fixed receptacle below said passageway and having its upper part communicating freely with a region of lower pressure than exists inside said generator, the bottom of said second receptacle being located above the normal water level in said fixed receptacle by an amount no greater than the height of a column of water corresponding to the desired pressure difference between the pressure side and the return side of said system, and connections between said second receptacle and the means for heating the generator arranged to restrain the heating operation upon the flow of water into said second receptacle, said first receptacle being of a size, material, and character of surface to cause it to act as a condenser whereby it is maintained full of water.

3. A pressure regulator for steam generators comprising a hollow metallic receptacle outside of said generator and having a heat transferring and radiating portion at its upper part, a pipe leading upwardly from the steam space of said generator to the upper part of said receptacle, means which may include the same pipe for relieving said receptacle of excess condensation, a second receptacle supported at one side of said first receptacle, the lower part of said first receptacle communicating with the lower part of said second receptacle at a point not higher above the liquid level in said first receptacle than the steam pressure desired in said generator, means operative upon a flow of water from said first receptacle to said second receptacle for restraining the operation of the generator-heating devices, and means yieldingly opposing such restraining operation.

4. A pressure regulator for steam generators comprising a hollow metallic receptacle located outside of the generator, a pipe connecting the upper part of said receptacle with the steam space of said generator, means for relieving said receptacle of excess condensation, a vertically movable receptacle communicating with the lower portion of said first receptacle and operatively connected to the means whereby heat is supplied to said generator, and means opposing the depression of said movable receptacle with a force varying directly with such depression, such means being adjustable as to amount whereby the steam pressure may be varied.

In testimony whereof I hereunto affix my signature.

THOMAS G. MOUAT.

Copies of this patent may be obtained for five cents each, by addressing the "Commissioner of Patents, Washington, D. C."